United States Patent [19]

Kawai et al.

[11] Patent Number: 4,972,129
[45] Date of Patent: Nov. 20, 1990

[54] PASSIVE SEAT BELT APPARATUS

[75] Inventors: Osamu Kawai; Shunzi Mizumura, both of Fujisawa, Japan

[73] Assignee: Nippon Seiko Kabushiki Kaisha, Tokyo, Japan

[21] Appl. No.: 220,062

[22] Filed: Jul. 18, 1988

[51] Int. Cl.$^5$ ............................ H02P 1/22; B60R 22/00
[52] U.S. Cl. ..................................... 318/285; 318/286; 280/801; 180/268
[58] Field of Search ............... 318/280, 283, 284, 285, 318/286; 180/268, 269, 270; 280/801–807

[56] References Cited

U.S. PATENT DOCUMENTS

| | | | |
|---|---|---|---|
| 3,904,884 | 9/1975 | Uota | 180/270 X |
| 4,344,502 | 8/1982 | Terabayashi | 280/802 X |
| 4,365,189 | 12/1982 | Hawkins et al. | 318/284 |
| 4,514,670 | 4/1985 | Fassel et al. | 318/286 X |
| 4,672,278 | 6/1987 | Ingraham et al. | 318/286 X |
| 4,686,598 | 8/1987 | Herr | 318/286 X |
| 4,708,365 | 11/1987 | Nakano et al. | 280/801 |

FOREIGN PATENT DOCUMENTS 2011648 7/1979 United Kingdom ............... 318/286

Primary Examiner—Bentsu Ro
Attorney, Agent, or Firm—Shapiro and Shapiro

[57] ABSTRACT

A passive seat belt system comprises a seat belt adapted to reciprocate between a fasten end and a release end so as to be fastened and released to and from a rider, a motor for driving the seat belt, and a controller for controlling the motor so as to fasten and release the seat belt to and from the rider as he enters and exits the vehicle. The controller controls the motor in such a manner that the motor is stopped and then reversely rotated after the lapse of a predetermined period when the motor is to be reversely rotated during rotation thereof.

7 Claims, 6 Drawing Sheets

PASSIVE SEAT BELT APPARATUS

BACKGROUND OF THE INVENTION

1. Field of the Invention

The present invention relates to a passive seat belt apparatus, and more particularly to an apparatus which has means for protecting a relay circuit for controlling a direction of rotation of a seat belt drive motor.

2. Related Background Art

FIG. 1 shows a drive circuit for a motor used in an apparatus of this type.

Let us assume that when a door is opened, the motor is forwardly rotated to move a slider connected to one end of a seat belt toward a front end of a body (that is, a relay RL1 is energized), and when the door is closed, the motor is reversely rotated to move the slider backward (that is, a relay RL2 is energized). A voltage waveform of the relay circuit and a current waveform of the motor are shown in FIG. 2. When the relays RL1 and RL2 are energized and deenergized, large rush current spikes and cutoff current flow in the motor, respectively.

When the door is closed while the slider is moved forward, the rush current by the relay RL2 is added to the cutoff current by the relay RL1 as the motor is switched between forward rotation and backward rotation. As a result, a very large spike current flows. This is clear from FIG. 3 which is similar to FIG. 2. The same phenomenon takes place when the door is opened while the slider is moved backward. Since the relay contact is switched at that time, the relay contact is adversely affected. Accordingly, a relay having a large rated power (or contact capacity) is used in the prior art apparatus.

SUMMARY OF THE INVENTION

It is an object of the present invention to provide a safe passive seat belt device by protecting a relay circuit.

It is another object of the present invention to reduce the rated power of a relay, the weight of an apparatus and the cost of production.

In accordance with a feature of the passive seat belt apparatus of the present invention (which apparatus fastens and releases a seat belt to and from a seat occupant by reciprocally moving the seat belt between a fasten end and a release end as the occupant gets on and off the vehicle), drive currents of opposite polarities are applied to a motor for reciprocally driving the seat belt, with a time lag between those drive currents to change a direction of rotation of the motor.

DETAILED DESCRIPTION OF THE PREFERRED EMBODIMENTS

Figure 4:
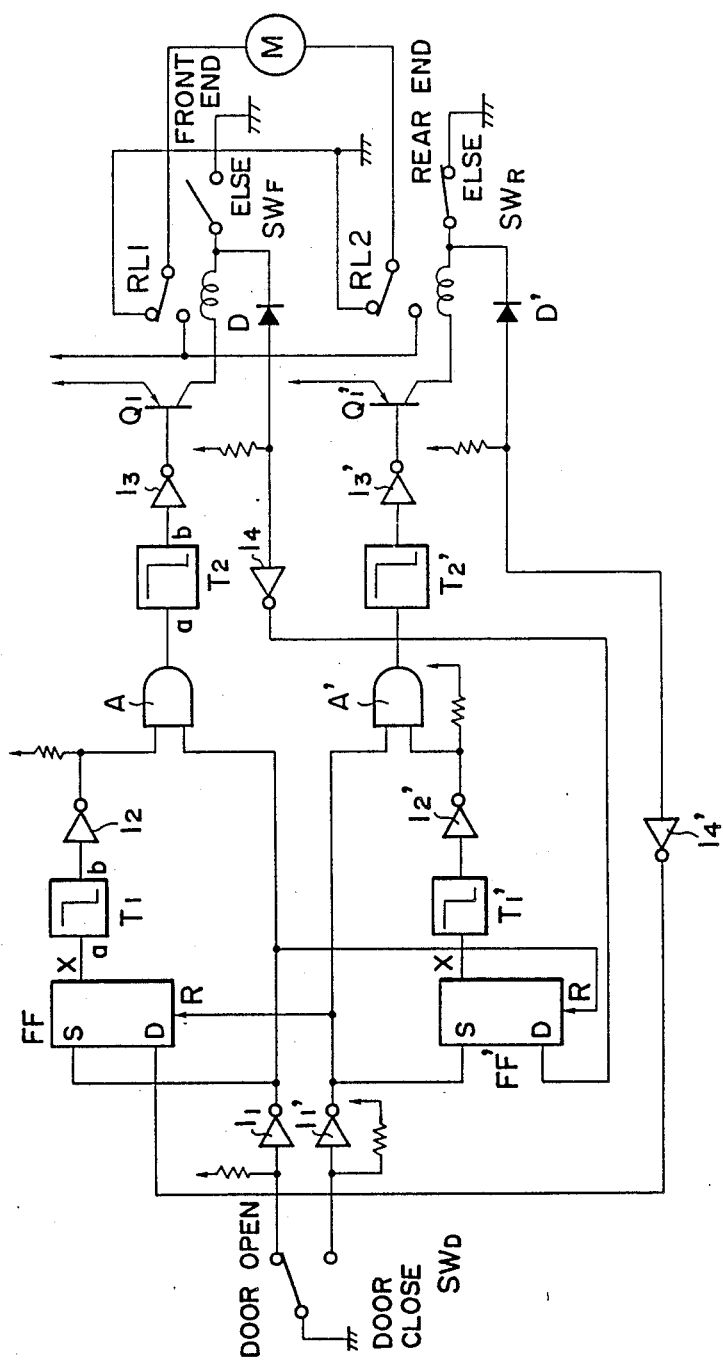
FIG. 4 shows a configuration of one embodiment of the present invention.

FIG. 4 shows one embodiment of the present invention.

The direction of rotation of a motor M is controlled by a relay circuit. Excitation coils of relays RL1 and RL2 of the relay circuit are grounded through limit switches SWF and SWR arranged at a front (release) end and a rear (fasten) end of a seat belt, respectively. Timers T2 and T2' are connected to bases of relay circuit drive transistors Q1 and Q1' through inverters I3 and I3', respectively.

Junctions of the excitation coils of the relays RL1 and RL2 and the limit switches SWF and SWR are connected to D terminals of flip-flops FF' and FF through inverters I4 and I4', respectively.

Outputs of the flip-flops FF and FF' are supplied to first input terminals of AND circuits A and A' through timers T1 and T1' and inverters I2 and I2', respectively.

A door open contact of a door switch SWD is connected to a set terminal of the flip-flop FF, a reset terminal of the flip-flop FF' and the other input terminal of the AND circuit A through an inverter I1. A door close contact of the door switch SWD is connected to a set terminal of the flip-flop FF', a reset terminal of the flip-flop FF and the other input terminal of the AND circuit A'.

When the reset terminal R of the flip-flop FF or FF' is "1" (High level), an output terminal X thereof is "0" (Low level) and it is held until the set terminal S thereof is set to "1". When the terminal S is set to "1", the value at the input terminal D is outputted to the terminal X and it is held. The value at the terminal X changes only when the terminal S is set to "1" or the terminal R is set to "1".

When an input $a$ of the timer T1 or T1' receives "1", it produces "1" at an output $b$ for a predetermined time, and then it assumes "0". When the input $a$ is "0", the output $b$ is "0". When the input a becomes "0" while the output b is "1", the output b immediately becomes "0".

The timers T2 and T2' are identical to the timers T1 and T1' except for time-out periods.

The release end switch SWF and the fasten end switch SWR are limit switches which are turned off when the seat belt slider is at the release end or fasten end, and turned on in other cases.

Let us assume that a rider opens the door to exit the car when the seat belt slider is at the fasten end. The door switch swd is switched from the door close position to the door open position, and the inverter I1 produces a "1" output so that "1" is applied to the terminal S of the flip-flop FF and one input terminal of the AND circuit. Since the fasten end switch SWR is kept off, the output of the inverter I4' is "0" and the terminal D of the flip-flop FF is "0". Thus, when "1" is set at the terminal S, the value at the terminal D, that is, "0" appears at the terminal X of the flip-flop FF. As a result, the output b of the timer T1 becomes "0" and the output of the inverter I2 becomes "1", and "1" is applied to the other input terminal of the AND gate A. Thus, both input terminals to the AND gate are "1" and the output thereof is "1". As a result, the output b of the timer T2 is also "1". The output of the timer T2 is inverted by the inverter I3 which renders the PNP transistor Q1 conductive (the release end switch SWF is ON at this time)

so that the relay RL1 is energized to supply a drive current to the motor M. The motor drives the slider from the fasten end to the release end. When the slider reaches the release end, the release end switch SWF is turned off to stop the rotation of the motor.

If the door switch is closed while the motor drives the slider from the fasten end to the release end, the door switch SWD is switched to the door close position, and "1" is applied to the terminal S of the flip-flop FF'. Since the slider is spaced from the fasten end and the release end switch SWF is ON, the output of the inverter I4 is "1"' and "1" is applied to the terminal D of the flip-flop FF'. As a result, the output X of FF' is "1" and the output of the inverter I2' is kept "0" until the timer T1' times out. Thus, the AND circuit A' is kept closed to inhibit the reverse rotation of the motor M. When the timer T1' times out, the output of the timer T1' assumes "0" and the output of the inverter I2' assumes "1" so that the AND gate is opened and the output "1" is supplied to the inverter I3' through the timer T2'. Thus, the output of the inverter I3' becomes "0" to render the PNP transistor Q1' conductive so that the motor is reversely rotated.

If the rider enters the car and closes the door and then opens the door while the slider moves, the timer T1 operates to retard the reversal of the motor.

Figure 1:
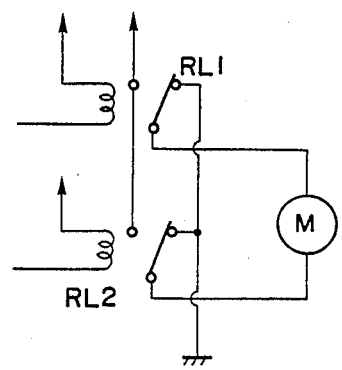
FIG. 1 shows a configuration of a prior art system.
Figure 2:
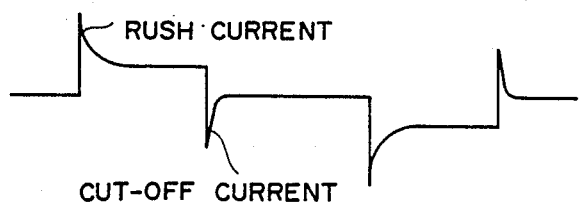
FIG. 2 shows of the system in FIG. 1.
Figure 2:
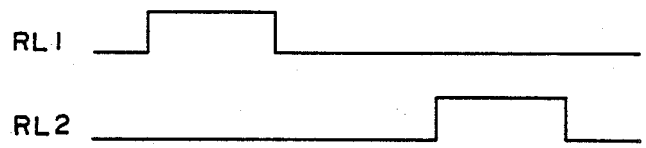
Figure 3:
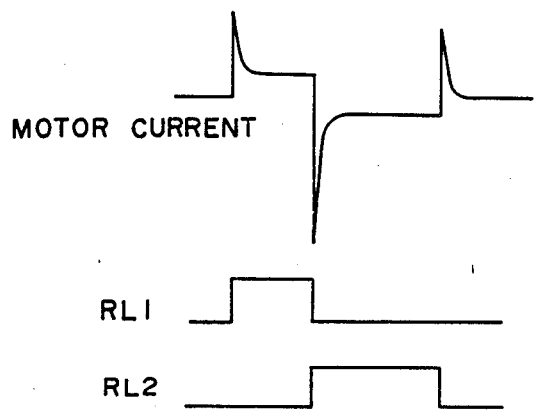
FIG. 3 shows waveforms when a door is opened and closed while a slider is moved.
Figure 5:
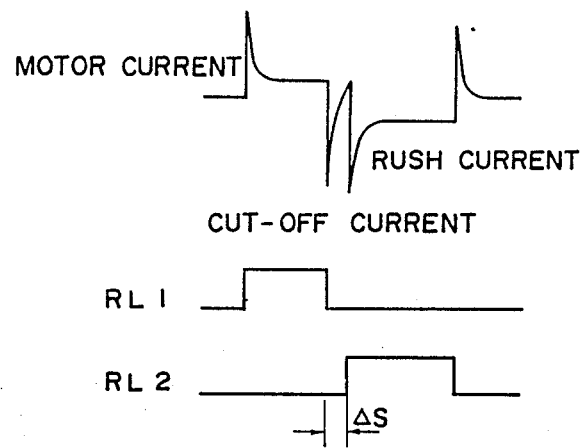
FIG. 5 shows waveforms of the embodiment in FIG. 4.

FIG. 5 shows a current of the motor and voltage waveforms of the relays RL1 and RL2 in the present embodiment, in comparison with FIG. 2. As seen from FIG. 2, a cutoff current and a rush current are generated nonsimultaneously ($\Delta S$ = time difference) and they are not added together.

The timers T2 and T2' function to stop the drive of the motor when the slider does not reach the fasten end or release end within the time-out periods. Namely, they monitor the movement of the slider.

Figure 6:
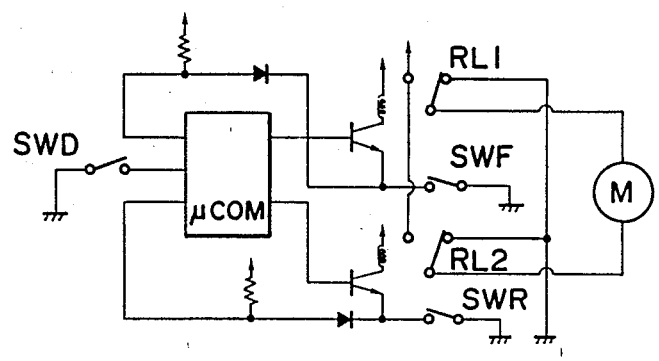
FIG. 6 shows another embodiment of the invention.

FIG. 6 shows another embodiment of the present invention. In the present invention, the embodiment of FIG. 4 is systemized by using a microcomputer. The like reference designations to those used in FIG. 4 indicate like elements.

The connections of the elements in the embodiment of FIG. 6 are clear from the drawing and the explanation thereof is omitted. A substantial difference from FIG. 4 resides in that the timers and interface circuits have been replaced by a microprocessor $\mu$COM.

Figure 7:
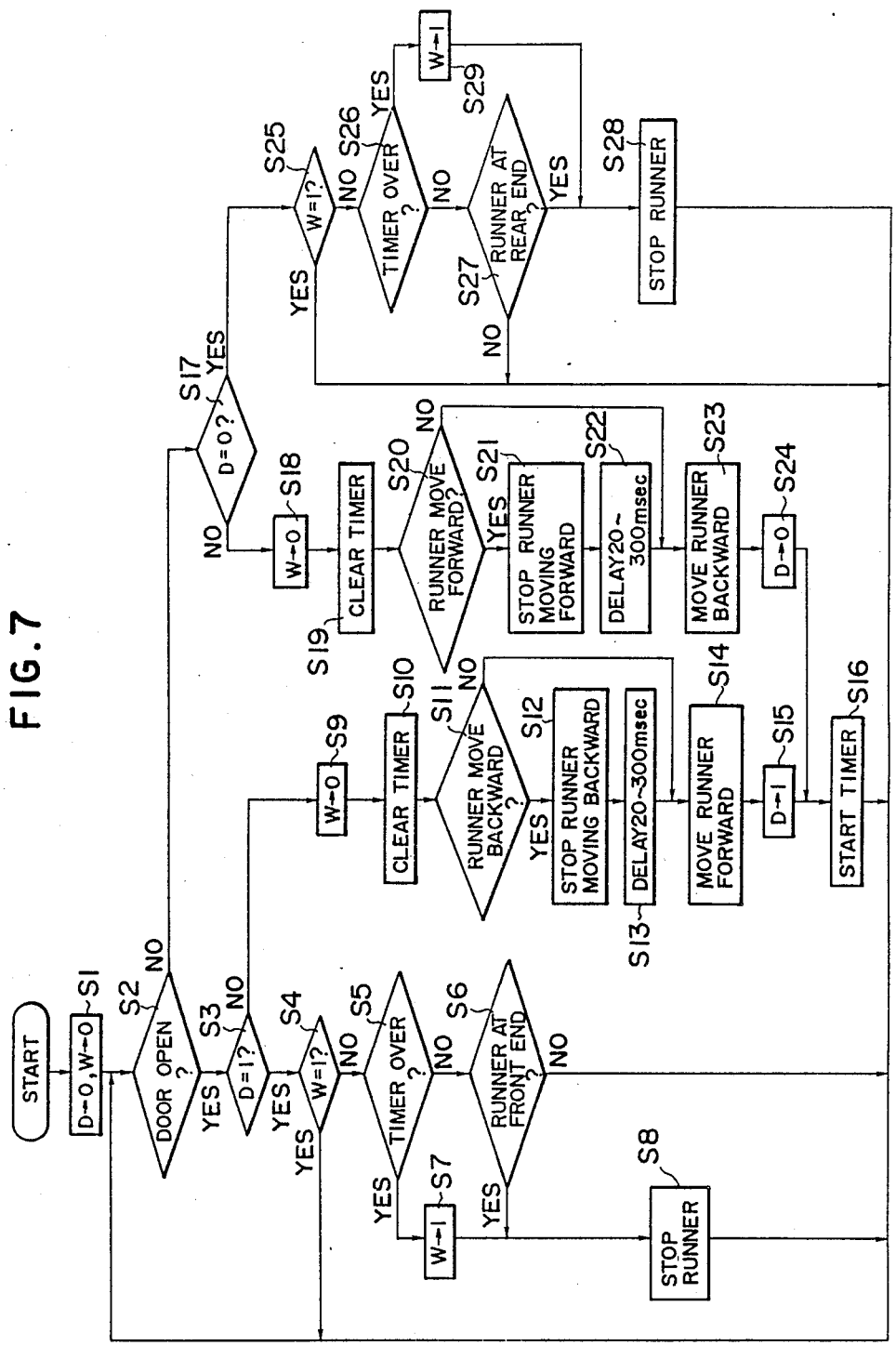
FIG. 7 shows a flow chart of the operation of the embodiment in FIG. 6.

FIG. 7 shows a flow chart of the operation of the present embodiment. D denotes a door status flag which is "1" when the door is open and "0" when the door is closed. W denotes a flag for indicating the time-out of the timer (corresponding to the timers T2 and T2' of FIG. 4), which is "1" after the time-out and reset when the door is switched.

In a step S1, flags are initialized, that is flags D and W are zero. In a step S2, open/close state of the door is examined. If the door is open, the flags D and W are examined (steps S3 and S4), and if D is "1" and W is "0", the time-out of the timer is checked in a step S5. In a step S6, whether a runner (slider) has reached a front end (unload end) or not is checked. If it has not reached the forward end, the process returns to the step S2.

In the step S4, if W is "1", the process returns to the step 2. In the step S5, if the timer is timed out, the flag W is set (step S7) to stop the runner (step S8). Then, the process returns to the step S2. In the step S6, if the runner reaches the forward end, the runner is stopped (step S8) and the process returns to the step S2.

In the step S3, if the flag D is "0", the flag W is reset (step S9), the timer is cleared (step S10) and the process proceeds to a step S11. If the runner is being moved backward, the drive current to the motor is stopped to stop the backward movement of the runner. A short time later, the motor is driven to forwardly move the runner (steps S12, S13 and S14). Then, the flag D is set (step S15), the timer is started (step S16) and the process returns to the step S2.

In the step S2, if the door is closed, the process proceeds to a step S17 where the flag D is checked. A flow of operation for D="0", that is, steps S25 to S29, corresponds to the steps S4 to S8; and a flow of operation when D="1", that is, steps S18 to S24 corresponds to the steps S9 to S15.

The above flows are explained with reference to specific operations.

Let us assume that a rider opens the door to exit the car when the runner is at the fasten end (rear end). Since D is "0" and W="0" in the previous state, the process proceeds to the steps S2, S3, S9, S10 and S11. Since the decision in the step S11 is NO, the process jumps to the step S14 where the runner is moved forward. Then, the process proceeds to the steps S15 and S16, and returns to the step S2. In the next cycle, since D is "1", the process proceeds to the steps S4, S5 and S6 until the timer is timed out and the runner reaches the release end (front end). When the timer is timed out or the runner reaches the fasten end, the runner stops.

Let us assume that the door is opened when the crew has entered the car and closed the door and the runner has started to move (from the release end to the fasten end). Since the flag D is now not "1", the process proceeds to the steps S2, S3, S9, S10 and S11. Since the decision in the step S11 is YES, the process proceeds to the steps S12, S13 and S14. The supply of current to the motor is stopped to stop the runner which is being moved backward, but the motor is not immediately rotated reversely but a reverse current is supplied to the motor with a delay time to move the slider forward.

When the rider has entered the car and closes the door, the operation upon closing the door will be readily understood from the above description. The explanation thereof is omitted to avoid the duplication.

Figure 8:
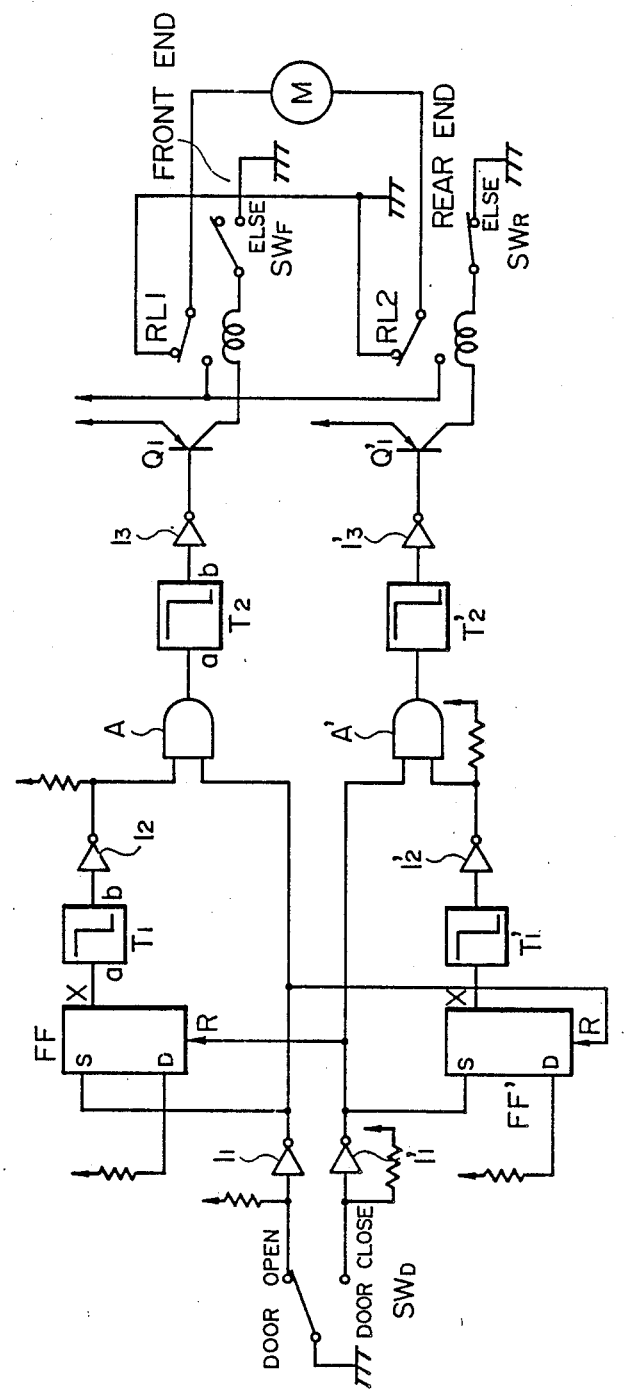
FIG. 8 shows a configuration of still another embodiment of the present invention.

FIG. 8 shows still another embodiment of the present invention. The like references to those used in FIG. 4 designate like elements. This embodiment is different from that shown in FIG. 4 in that the terminals D of the flip-flops FF and FF' always input "1" (High level) independently of states of the front end and the rear end. Accordingly, whenever the terminal S receives "1", an output X is "1" so that the timer T1 or T1' is energized to supply a delayed output to the AND circuit A or A'.

Figure 9:
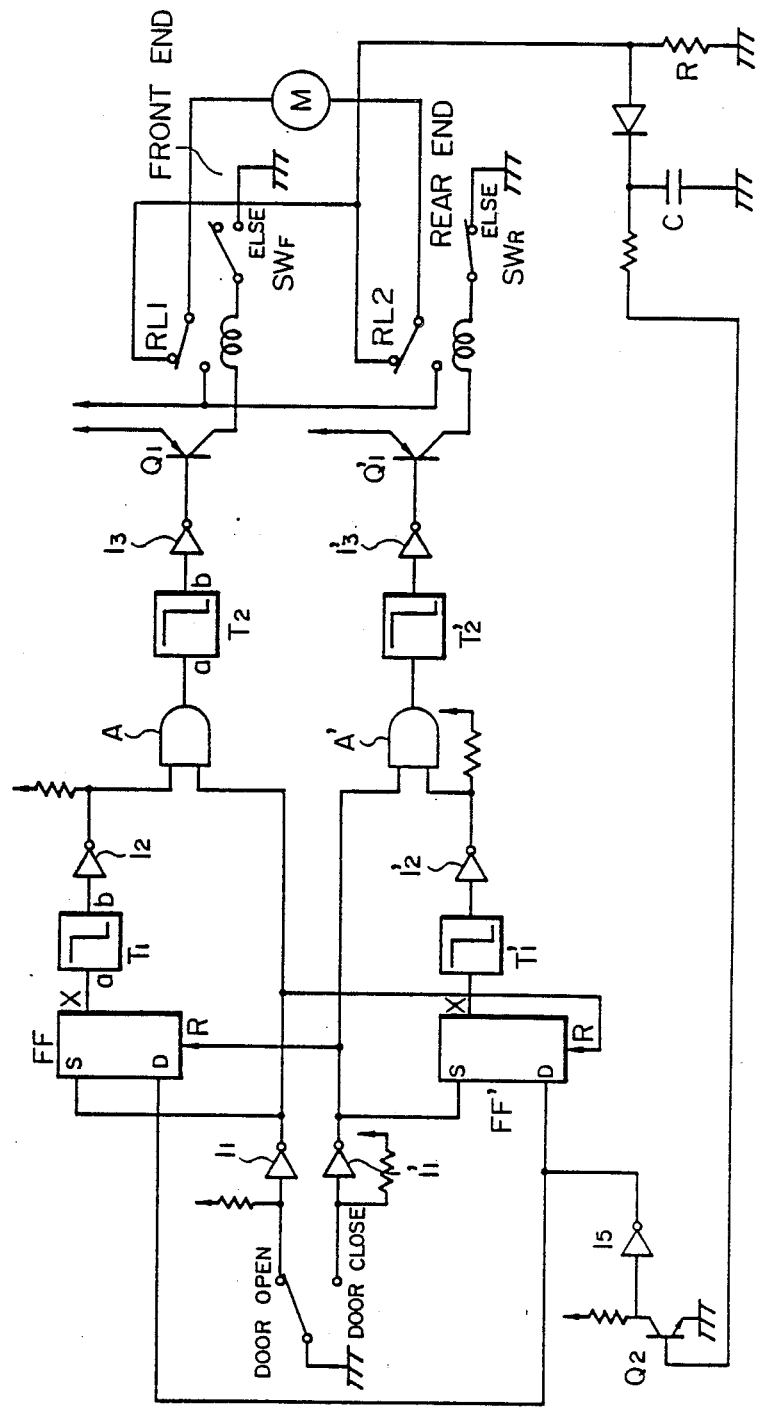
FIG. 9 shows a configuration of still another embodiment of the present invention.

FIG. 9 shows a still another embodiment of the present invention. The like references to those used in FIG. 4 designate the like elements.

In this embodiment, there is provided means for detecting a motor current (it is generally equal to detection of motor rotation). When a door signal is switched during rotation of a motor, a current to be supplied to the AND circuit A or A' is delayed.

More detailed description is as follows. Unlike the embodiment shown in FIG. 4, ground contacts of the relays RL1 and RL2 are grounded through a resistor R. A voltage across the resistor R is applied to a base of a transistor Q2 through a diode. The value of the resistor R is selected so as to render transistor Q2 conductive during rotation of the motor.

During rotation of the motor, the transistor Q2 is ON so that an inverter I5 connected to a collector of the transistor receives "0" (Low level) to output "1" (High level). Then, an input of the terminal D of the flip-flops FF and FF' becomes "1". When a door signal is switched at this time, an output X of the flip-flop FF or FF' becomes "1" so that the timer T1 or T1' is driven to supply a delayed output to the AND circuit A or A'.

In FIG. 9, a capacitor C is employed to obtain a voltage required for keeping the transistor Q2 conducting for a short time after the motor current is zero.

The embodiments of the present invention offer the following advantages.

In the present invention, when the motor is to be reversely rotated as the door is opened or closed, the current of reverse polarity is supplied to the motor with a delay time. As a result, the generation of spike currents due to addition of the cutoff current and the rush current is avoided, and the durability and safety of the apparatus is significantly improved. Further, since the capacity of the relay used in the control circuit for the motor is reduced, the weight and cost of the apparatus can be reduced.

We claim

1. Passive seat belt apparatus comprising:
   a seat belt adapted to reciprocate between a fasten end and a release end to secure and release a vehicle occupant,
   a motor for driving said seat belt, and
   control means for controlling said motor to drive said seat belt between said fasten end and said release end and operating to control said motor in such a manner that said motor is stopped and then reversely rotated after the lapse of a predetermined period of time when said motor is to be reversely rotated during rotation thereof,
   said control means including detecting means for detecting opening and closing of a door, drive current control means including a flit-flop for controlling a drive current of said motor in response to a detection signal from said detecting means, and changing means for changing a rotating direction of said motor in response to an output signal from said drive current control means,
   said drive current control means also including delay means having a timer for delaying said output signal by said predetermined period.

2. Passive seat belt apparatus according to claim 1, wherein said changing means includes a relay circuit.

3. Passive seat belt apparatus comprising:
   a seat belt adapted to reciprocate between a fasten end and a release end to secure and release a vehicle occupant,
   a motor for driving said seat belt, and
   control means for controlling said motor to drive said seat belt between said fasten end and said release end and operating to control said motor in such a manner that said motor is stopped and then reversely rotated after the lapse of a predetermined period of time when said motor is to be reversely rotated during rotation thereof,
   said control means including first detecting means for detecting opening and closing of a door, second detecting means for detecting arrival of said seat belt at one of said fasten end and said release end, drive current control means including a flip-flop for controlling a drive current of said motor in response to respective detection signals from said first detecting means and said second detecting means, and changing means for changing a rotating direction of said motor in response to an output signal from said drive current control means,
   said drive current control means also including delay means having a timer for delaying said output signal by said predetermined period.

4. Passive seat belt apparatus according to claim 3, wherein said changing means includes a relay circuit.

5. Passive seat belt apparatus comprising:
   a seat belt adapted to reciprocate between a fasten end and a release end to secure and release a vehicle occupant,
   a motor for driving said seat belt, and
   control means for controlling said motor to drive said seat belt between said fasten end and said release end and operating to control said motor in such a manner that said motor is stopped and then reversely rotated after the lapse of a predetermined period of time when said motor is to be reversely rotated during rotation thereof,
   said control means including first detecting means for detecting opening and closing of a door, second detecting means for detecting rotation of said motor, drive current control means including a flip-flop for controlling a motor drive current in response to respective detection signals from said first and second detecting means, and changing means for changing a rotation direction of said motor in response to an output signal from said drive current control means,
   said drive current control means also including delay means having a timer for delaying said output signal by said predetermined period.

6. Passive seat belt apparatus according to claim 5, wherein said second detecting means detects arrival of said seat belt at one of said fasten end and said release end.

7. Passive seat belt apparatus according to claim 5, wherein said changing means includes a relay circuit.

* * * * *